United States Patent [19]

Boyd

[11] Patent Number: 5,419,190
[45] Date of Patent: May 30, 1995

[54] APPARATUS AND METHOD FOR MEASUREMENT OF MASS FLOW RATES IN A LARGE CONDUIT

[75] Inventor: Branin A. Boyd, Malvern, Pa.

[73] Assignee: Thermal Instrument Co., Trevose, Pa.

[21] Appl. No.: 923,838

[22] Filed: Aug. 3, 1992

[51] Int. Cl.⁶ .................................................. G01F 1/68
[52] U.S. Cl. ................... 73/204.25; 324/706; 324/725
[58] Field of Search .......... 73/204.15, 204.16, 204.18, 73/204.25, 204.26, 204.27; 324/706, 725; 364/482, 510

[56] References Cited

U.S. PATENT DOCUMENTS

| | | |
|---|---|---|
| 3,015,232 | 1/1962 | Schnoll . |
| 4,080,821 | 3/1978 | Johnston . |
| 4,400,974 | 8/1983 | Nishimura et al. ............. 73/204.15 |
| 4,494,406 | 1/1985 | Komons et al. . |
| 4,581,930 | 4/1986 | Komons . |
| 4,599,895 | 7/1986 | Wiseman . |
| 4,805,452 | 2/1989 | Eiermann et al. . |
| 4,856,329 | 8/1989 | Buck ............................ 73/204.26 |
| 4,916,948 | 4/1990 | Inada et al. . |
| 4,942,763 | 7/1990 | Harpster . |
| 4,969,357 | 11/1990 | Mickler . |
| 5,058,426 | 10/1991 | Kobayashi . |
| 5,108,193 | 4/1992 | Furubayashi . |
| 5,181,420 | 1/1993 | Suzuki et al. ................. 73/204.15 |

*Primary Examiner*—Herbert Goldstein
*Attorney, Agent, or Firm*—Ronald P. Kananen

[57] ABSTRACT

A method and apparatus for measuring mass flow rates and other characteristics of a fluid in a large conduit uses a sensor circuit having a heater/thermometer, a reference resistor, and a thermometer resistor arranged in four-wire network to enable measurement of all characteristics of the resistor network. That sensor circuit is preferably mounted on an interior wall surface of a support tube. A plurality of such support tubes, each having a plurality of sensors within the support tube, are mounted in an array in the cross section of the duct. A cleaning plate for cleaning the exterior surface of the support tube permits calibration of the network while cleaning. A program for using the circuit to calculate values of interest and to display desirable output data is also disclosed, as is a program for controlling the cleaning/calibration cycle.

25 Claims, 13 Drawing Sheets

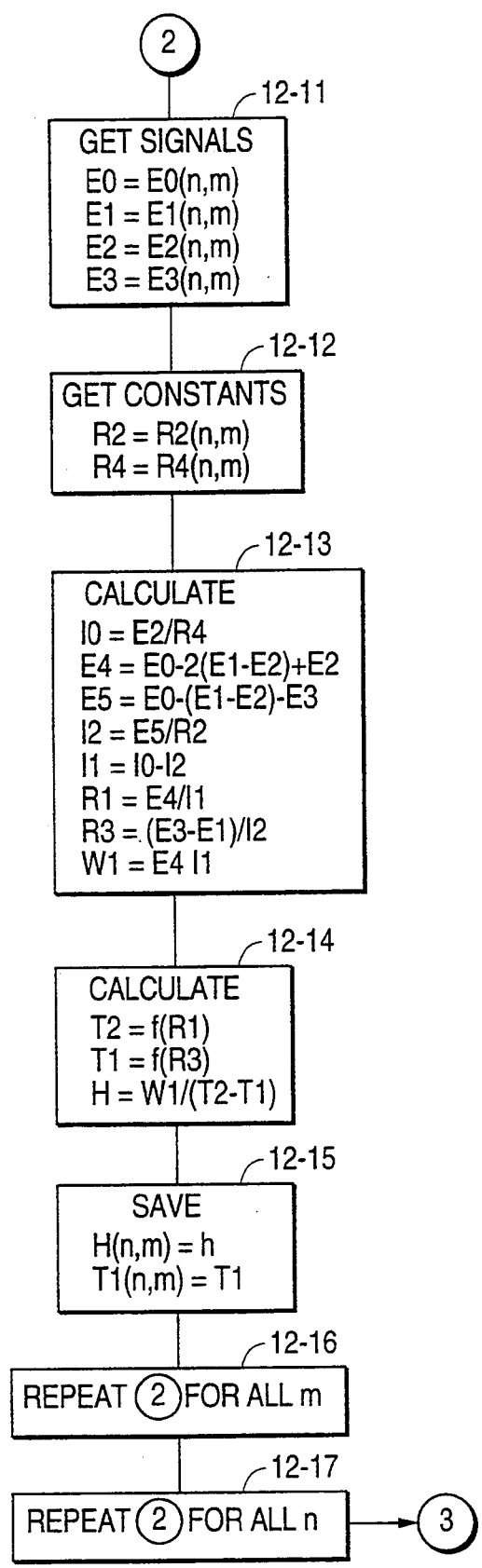

APPARATUS AND METHOD FOR MEASUREMENT OF MASS FLOW RATES IN A LARGE CONDUIT

This invention relates to the measurement of mass flow rates of a fluid, such as a gas, in a large conduit, such as a duct or stack. More particularly, this invention relates to a method and apparatus which effectively utilizes an array of flow sensors, each of which is supported in the conduit to provide an output signal representative of the mass flow of the fluid through the conduit according to the thermal characteristics of the fluid. Still more particularly, this invention relates to a flow meter element having a protective tube housing a flow sensor wherein each sensor includes a circuit for remotely measuring the heat transfer rate to the fluid from the circuit. Still more particularly, this invention relates to a flow meter array comprising a plurality of flow meter element arrays having a plurality of flow meter elements in a protective support tube wherein the flow meter array utilizes an apparatus for cleaning support tubes for the sensor array thus to provide periodic calibration tests.

Large ducts provide a convenient and economical method for conducting gas flows from one apparatus in a plant or factory to another. Such ducts are used extensively throughout virtually all industrial plants, including power plants. In such ducts, it is advantageous to collect data relative to temperature, pressure, gaseous constituents, and the like. However, among the most difficult data to collect for gas flow in a duct is data relating to the rate of flow of such gases in the ducts. One example of a current technique used to measure the rate of flow of gasses in such ducts is the use of a pivot tube where the flow rate is interpreted as a function of the gas impact pressure on a small, known area.

Another measurement technique for mass flow measurement in fluid measures dissipation of electrical energy in a heated element exposed to the flow. By balancing the heat transfer to the flow due to its increased temperature, a measure of the mass flow of fluid past the heated element can be determined. An example of such a technique is disclosed in U.S. Pat. No. 4,581,930 wherein a plurality of thermistors acting as sensors are placed in a duct to yield a signal representative of the mean velocity of the fluid medium.

In almost all practical situations, the flow pattern in a duct is highly irregular. That is, measurement of the flow rate at only one point in the duct can not be used effectively as representative of the average flow in the entire duct. Typical techniques require the measurement of flow at several points across the duct area and, given enough sensed points, a reasonable estimation of the total flow rate can be made. In most cases, however, the duct configuration is such that measurements must be made in a location where the flow pattern will be highly irregular, for example, when close to an elbow in the duct. Under such conditions, far more than the typical eight to ten measurement points are required for accurate measurements. Since current pressures for environmental care are demanding that plant gas emissions be measured and controlled with accuracy and confidence in the data, many of these situations are not suited for use of any known technique due to the high level of particulate matter carried by the gas which coats the support tubes and interferes with the calibrated heat transfer path. The discharge of an oil burner combustion chamber is a typical example of a gaseous exhaust emission somewhat laden with particulate matter. Such an exhaust emission is very hot, typically 450 to 600 degrees F. and very dirty, including corrosive chemicals which can destroy or adversely affect readings from sensitive instrumentation.

It has thus remained a significant problem in the art to provide a flow meter for measuring the mass rate of flow of fluids, such as gases, within a duct, wherein the flow meter includes a plurality of flow meter elements which include a flow sensor and a protective support tube for the flow sensor. It is an additional problem to provide such a flow meter having a plurality of flow meter element arrays arranged for insertion across the profile of the duct.

The prior art has provided examples of a flow sensor assembly having mounting tubes and a sequence of tubular sensor support which together create a tube-like probe for measurement of flow velocity through observance of heat transfer rates of sensors located at the sensor supports. A typical example of such an assembly is seen in U.S. Pat. No. 4,492,763 to Harpster. See also U.S. Pat. Nos. 3,015,232 to Schnoll and 4,805,452 to Eiermnn. None of the references has addressed tube surface contamination in hostile environments as affecting calibrated heat sensor flow.

It nevertheless has remained a problem in the art to measure flow rates in hostile environments having high temperatures and high concentrations of particulate matter. For example, current environmental regulations may require that operators of plants which discharge dirty gases into the atmosphere maintain highly accurate records regarding the make-up and volume of the plant discharge. Obtaining such data can be a problem in the art since, aside from obtaining accurate mass flow rate measurements in a hostile environment, in the design of ducts carrying gases, there often is no straight section of duct where the flow pattern can normalize. There, the flow profile is typically very irregular and frequently non-repetitive especially when affected by whorls and eddies within the duct. Thus, it remains a continuing problem in this art to provide accurate flow rate measurement of gases in hostile conditions within irregular ducts.

BRIEF SUMMARY OF THE INVENTION

It is thus an overall object of this invention to provide a flow sensor having a resistor network which includes resistors and resistor thermometers for use in a method and apparatus for measuring the mass flow rate of gases in a large duct.

It is another overall object of this invention to provide a flow meter element comprising a flow sensor made from a resistor network and a protective support tube structurally adapted to be positioned within the environment of the duct in which the mass flow rate of gases is to be determined.

It is still another overall object of this invention to provide a flow meter array comprising a plurality of flow meter elements each having at least one flow sensor and a protective support tube, wherein the flow meter array is structurally adapted for location in a duct for measuring the mass rate of flow of fluids in the duct.

It is still another overall object of this invention to provide a flow meter array comprising a plurality of flow meter elements each having a plurality of flow sensor in protective support tube, wherein the flow meter array is suited for location in a duct carrying gases so that a plurality of zones in the duct are available for measurement.

It is still another overall object of this invention to provide a mechanism for cleaning the flow meter array when positioned in situ in a duct.

It is still another overall object of this invention to provide a mechanism for calibrating the flow meter array when positioned in situ in a duct, and for calibrating while cleaning.

It is still another object of this invention to provide as a unit a flow meter array in combination with a cleaning mechanism for cleaning the exterior surfaces of the support tubes in situ.

It is a final object of this invention to provide a program for processing signals from the flow sensor to determine the heat transfer coefficient of the sensor, and to determine other parameters of the flow sensor and the gas flow.

Directed to achieving the aforementioned objects, and overcoming the above-noted problems in this art, one aspect of this invention relates to a flow sensor in the form of a resistor network comprising a resistor thermometer located at a remote location associated with a heater/thermometer. The resistor thermometer is in a series circuit with a reference resistor and the series circuit is in parallel with the heater/thermometer resistor. A current reference resistor is connected to the node connecting the series circuit at one end of the heater/thermometer resistor, while the other node at the other end of the heater/thermometer is connected to a source of power. Four terminals are provided, respectively connected to the first and second nodes at the opposed ends of the heater/thermometer, to the current reference resistor, and to the common connection between the reference resistor and the thermometer resistor. These four terminals, and the current reference resistor are used in a program to determine the rate of heat transfer between the heater/thermometer and the gas flow past the support tube. This heat transfer rate is known as the heat transfer coefficient. Preferably, the resistors are thin foil resistors.

A program is provided for analyzing the data from the resistive sensor circuit and determining the temperatures of the reference resistor and the heater/thermometer resistor and the power consumed in the sensor circuit to determine the mass flow rate of fluid in the duct for the sensor. When a plurality of such sensors are used in an array, the program provides a sequencing program for continuously determining the noted temperatures and mass flow, the flow average for the respective flows, and a calibration check.

In another aspect, the invention relates to a flow meter element comprising a flow sensor of the resistor network type described above mounted on an interior surface of a protective support tube made, for example, from stainless steel. A plurality of flow meter elements or flow sensors within a tube may be provided to produce a flow meter element array. In use, a plurality of flow meter element arrays are used to provide a flow meter array, thus to provide a grid of flow sensors located at spaced points across a duct in which the flow meter array is positioned. Thus, a plurality of sensors provide heat transfer coefficients which are sensed according to the program of the invention, whereupon a plurality of mass flow rates can be determined based on each sensor.

Preferably, means are provided for cleaning the exterior surfaces of the protective support tubes in the protective array and calibrating the sensor while cleaning the tubes. The cleaning means comprises a cleaning plate having a plurality of cutouts juxtaposed adjacent columns of the support tubes. A jackscrew or other means for driving the cleaning plate are provided to cause the cleaning plate to traverse the length of the support tubes. Cleaning brushes mounted on the cleaning plate at the locations of the cutouts contact the exterior surface of the support tubes and thus clean the tubes. The program calls for calibration of the sensors during cleaning, and controls the periodic or a periodic cleaning cycle.

These and other objects, features, and advantages of the invention will become clear from the detailed description of the invention which follows taken in conjunction with the accompanying drawings.

DETAILED DESCRIPTION OF THE PREFERRED EMBODIMENTS

Figure 1:
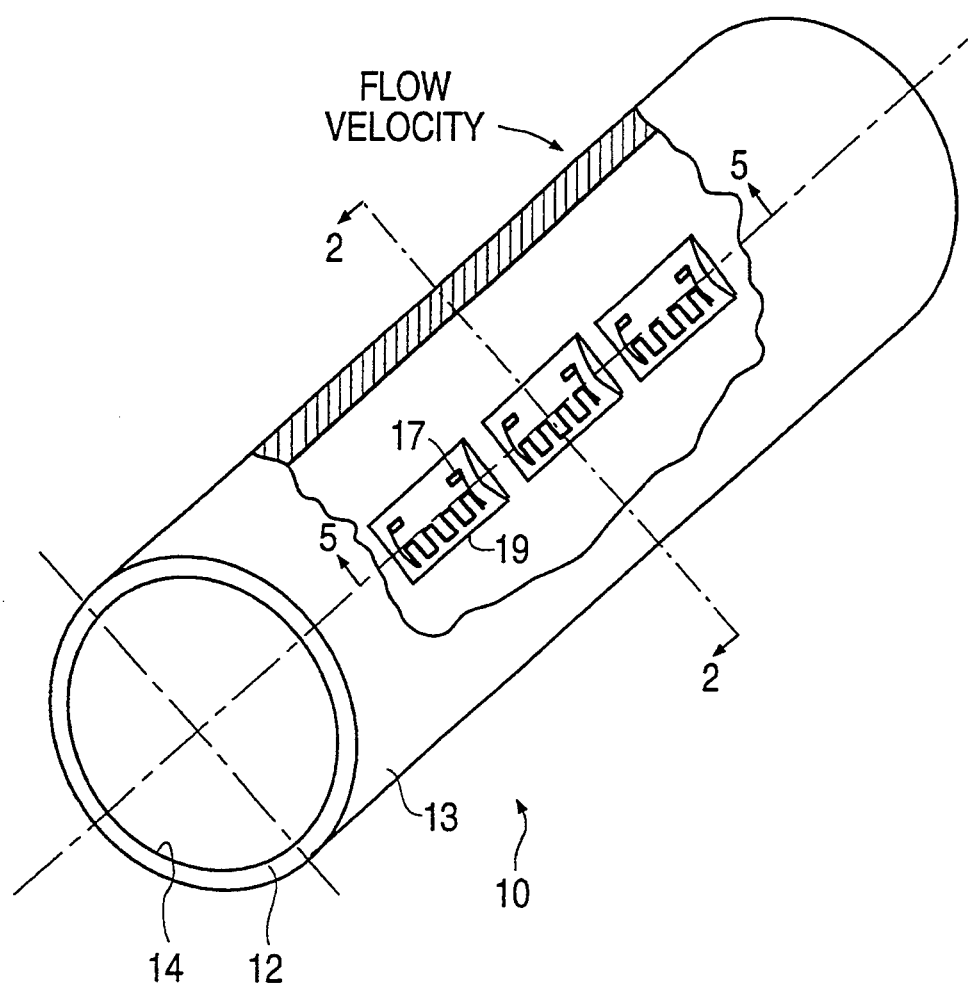
FIG. 1 is a fragmentary perspective view of a portion of a sensor array comprising a support tube supporting a plurality of thin foil resistors acting as sensors and comprising the sensor circuit.

In FIG. 1, a sensor array according to the invention is shown generally by the reference numeral 10 which includes an elongated, hollow, generally cylindrical tube 12, preferably made from stainless steel, and having an external wall 13 and an internal wall 14 on which are secured a plurality of sensors 16, 17, and 18 in the form of thin foil resistors. Thin foil resistors are commercially available components, available with very thin cross sectional thicknesses and with varying degrees of temperature coefficient of resistance. Specifically, such thin film resistors are available as high temperature coefficient resistors and low temperature coefficient resistors. Such thin film resistors 16, 17, and 18 are typically made of nickel, platinum, or Evanohm ® brand alloy.

Figure 2:
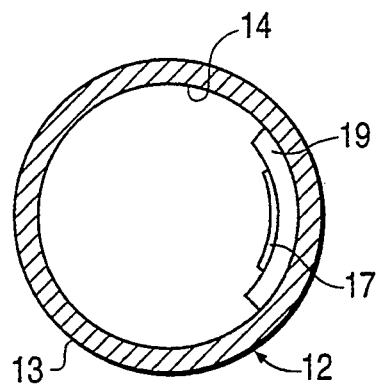
FIG. 2 is a cross sectional view of a sensor circuit mounted on a interior wall of the support tube of FIG. 1, taken along line 2—2 of FIG. 1.

It should be understood that the support tube shown in FIG. 1 is representative of a wider possible variety of shapes for the support tube. For example, the support tube 12 may also be square, rectangular, curved, or polygonal in shape, so long as there is a surface to which the resistors 16, 17, and 18 are secured by a suitable adhesive 19 as shown in an exaggerated fashion in FIG. 2. Such adhesives are well known and available in the strain gage art and in the precision resistor art for this purpose and are able to withstand the temperatures contemplated for the practical application of this invention to, for example, 1100 degrees C. A typical adhesive suitable for this purpose is W.L. Bean Type H cement, available from Precision Foil, Inc., Upland, California.

As will be seen, the array of sensors 16, 17, and 18 are interconnected as a circuit more fully described in connection with FIG. 4, and further shown in greater cross sectional detail in FIG. 5 for use in support tubes connected in an array as shown, for example, in FIGS. 6 and 7 as follows.

Figure 3:
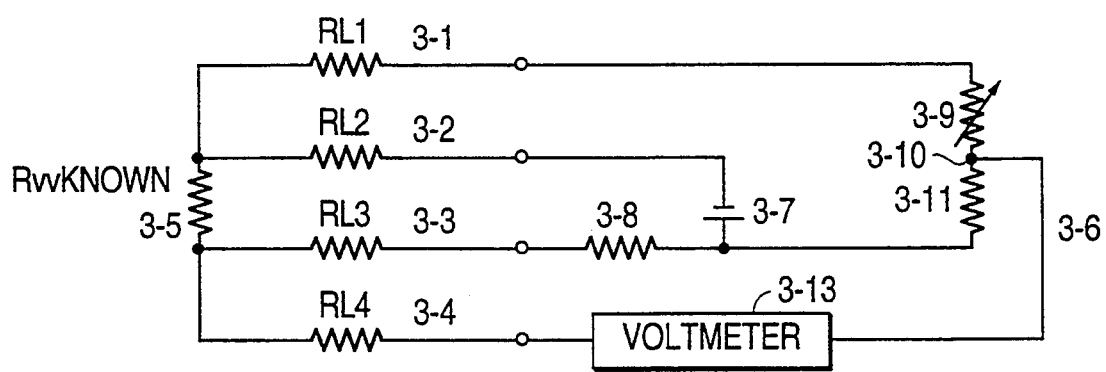
FIG. 3 is a prior art circuit showing a four-terminal or four-wire bridge system to eliminate the effect of lead resistance in the measurement of a resistor typically used in a resistance-temperature detector.

FIG. 3 shows a typical four-terminal, four-wire system, and known in the existing art for measuring temperature at a remote location as a function of resistance. While it may not be necessary to discuss generally the prior art associated with variation of the well-known Wheatstone Bridge circuit, it may be of use here for easy reference in understanding the improvements of the invention. The variation of the Wheatstone Bridge circuit known as a four-wire bridge is illustrated in FIG. 3. It is the purpose of this configuration to minimize the effect of lead resistance, shown as resistors RL1 through RL4, on the accuracy of the measurement of the remote unknown resistor 3-5.

Lead wires 3-1 through 3-4 connect the remote unknown resistor 3-5 with a special version of the Wheatstone Bridge shown generally by the reference numeral 3-6. In particular, a lead 3-2 with a lead resistance RL2 is connected to a source of power 3-7 such as a battery and a lead 3-3 with its lead resistance RL3 is connected to a precise known resistor 3-8. The closed circuit formed by a battery 3-7, a lead 3-2 with the lead resistance RL2, an unknown remote resistor 3-5, a lead 3-3 with a lead resistor RL3 and the precise reference resistor 3-8 closes a circuit for current from the power source 3-7. Lead wire 3-1 with lead resistor RL1 connects to a variable resistor 3-9. The value of the variable resistor 3-9 is known with high precision. The variable resistor 3-9 connects at a node 3-10 with a precision resistor 3-11 and through a lead 3-12 to a high-sensitivity voltmeter 3-13.

The basic Wheatstone Bridge configuration can be recognized by including the lead resistor RL1 as a part of the variable resistor 3-9, including the lead resistance RL3 with the resistance of the reference resistor 3-8 and including a lead resistor RL4 as part of the impedance of the voltmeter 3-13. By design, the impedances of variable resistor 3-9, reference resistor 3-8, and voltmeter 3-13 are very high compared to the respective resistance values of RL1, RL3, and RL4. The error contributed by the lead resistors RL1, RL3 and RL4 is equal to the ratio of their impedance to that of the component with which they are connected. Ratios of one million to one between the resistance of the lead resistors and that of their associated components are easily obtained. Lead resistor RL2 can be considered as a part of the source impedance of the power source 3-7 and does not appear in the bridge equation:

$$\frac{resistor3\text{-}5}{RL3 + resistor3\text{-}8} = \frac{RL1 + resistor3\text{-}9}{resistor3\text{-}11}$$

A variation of this art, also well known, is a three lead-wire configuration one implementation of which enables a computing circuit to eliminate the effect of the lead resistances by calculating this resistance and subtracting it from the derived value of the unknown remote resistor. This technique will be described in detail in the discussion of FIG. 4.

Figure 4:
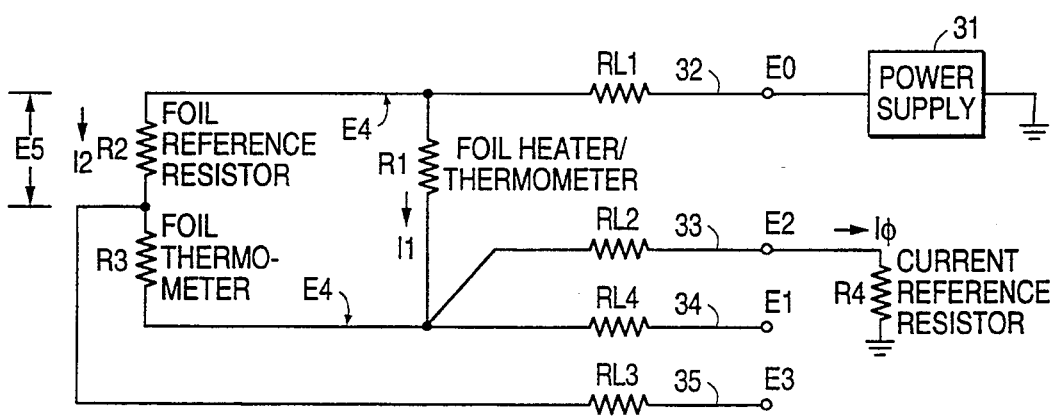
FIG. 4 is an improved circuit over that shown in FIG. 3 showing a four-wire system to enable measurement of a second resistance group at a location remote from a circuit analyzer, wherein the second resistance element includes a thermometer resistance element and a reference resistance element.

FIG. 4 illustrates an improved circuit 30 according to the invention for measuring the resistance of a foil thermometer R3 located at a remote location, in association with a foil heater/thermometer R1. A power supply 31 is connected at the terminal E0 in circuit with the lead 32 having a lead resistance RL1 and provides a sufficient current through the series circuit of the lead 32, the resistor R1, the lead 33 having a lead resistance RL2 to terminal E2, through a resistor R4, functioning as a current reference resistor. Resistors R2 and R3 are connected in series and the series connection of the resistors R2 and R3 is connected in parallel with R1. The common connection between the resistors R2 and R3 is connected by a lead 34 with its associated lead resistance RL3 to a terminal E3. The common connection between the resistor R1, the resistor R3, and the lead 33 is also connected to a lead 35 having a lead resistance RL4 and connects to the terminal E1.

In operation, the voltage from the power supply 31 connected to the terminal E0 provides sufficient current through the lead 32, the resistor R1, lead 33, terminal E2, and resistor R4 to cause significant self-heating in R1, such as a temperature rise of 10 degrees C. Typical circuit values are R1=50 ohms at 0° C.; R2=1000 ohms; R3=100 ohms at 0° C.; R4=10 ohms; and E0=12 volts. Resistors R1 and R3 have a precise high temperature coefficient of resistance such as presented by a platinum foil resistor. R2 and R4, on the other hand, have a very low temperature coefficient, typically less than 5 ppm/degrees C. The current flow I1 causes a voltage drop across R1 which is identical to the voltage drop across R2 and R3, and thus impresses a current flow I2 through R2 and R3. The voltages at E0, E1, E2, and E3 are used to determine the circuit parameters in the resistor array as follows.

R2 and R4 are known values. It is reasonably assumed that all lead resistances are equal. From those two values, the values of the resistors R1 and R3 are calculated, and the power delivered to the resistor R1 is calculated. These calculations are made by solving the following equations (1) to (8) in the order stated.

$$I0 = E2/R4 \tag{1}$$

$$E4 = E0 - 2(E1-E2) - E2 \tag{2}$$

$$E5 = E0 - (E1-E2) - E3 \tag{3}$$

$$I2 = E5/R2 \tag{4}$$

$$I1 = I0 \tag{5}$$

$$R1 = E4/1 \tag{6}$$

$$R3 = (E3-E1)/I2 \tag{7}$$

$$W1 = E4*I1 \tag{8}$$

The form of these equations is made for clarity of circuit analysis. Obvious algebraic reduction is possible.

Figure 5:
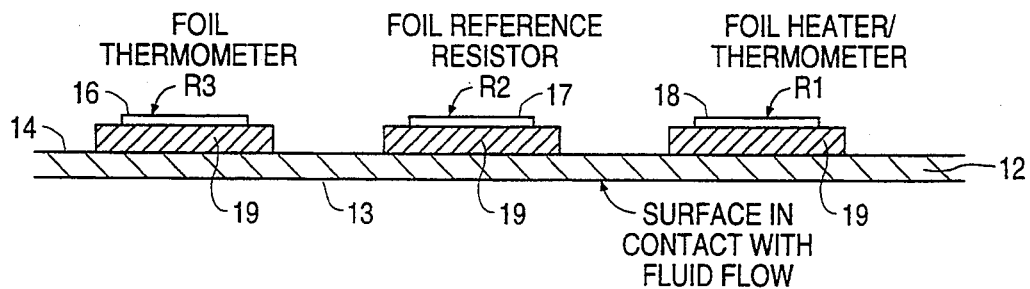
FIG. 5 is a side cross sectional view of the circuit of FIG. 4 as shown when applied to the interior wall of the support tube as shown in FIG. 1, taken along line 5—5 of FIG. 1.

FIG. 5 is a lateral transverse view taken along line 5—5 of FIG. 1 and thus shows resistors 16, 17 and 18 as related to the foil thermometer R3, the foil reference resistor R2, and the foil heater/thermometer R1 shown in FIG. 4 and described in the accompanying text.

Figure 6:
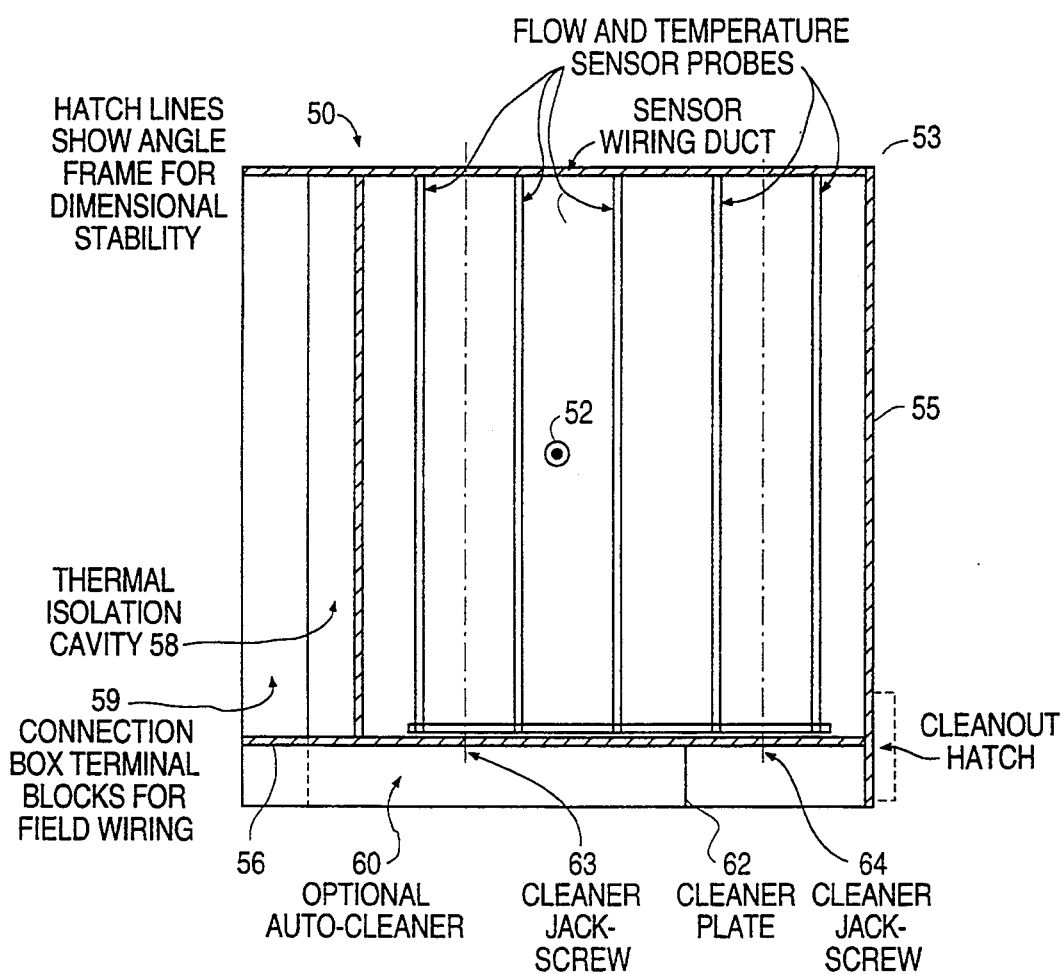
FIG. 6 is a front elevational view of a plurality of sensor support tubes located in a conduit, facing the flow through the conduit.
Figure 7:
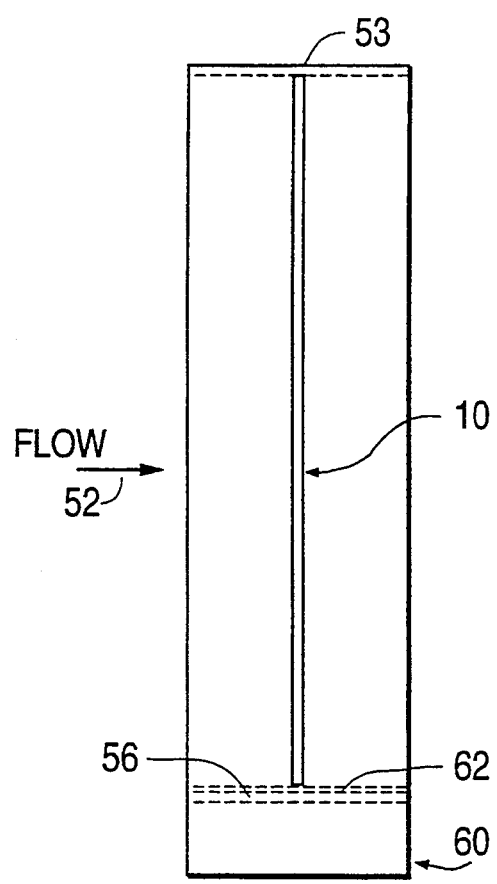
FIG. 7 is a side elevational view of the tubes and conduit shown in FIG. 6.
Figure 10:
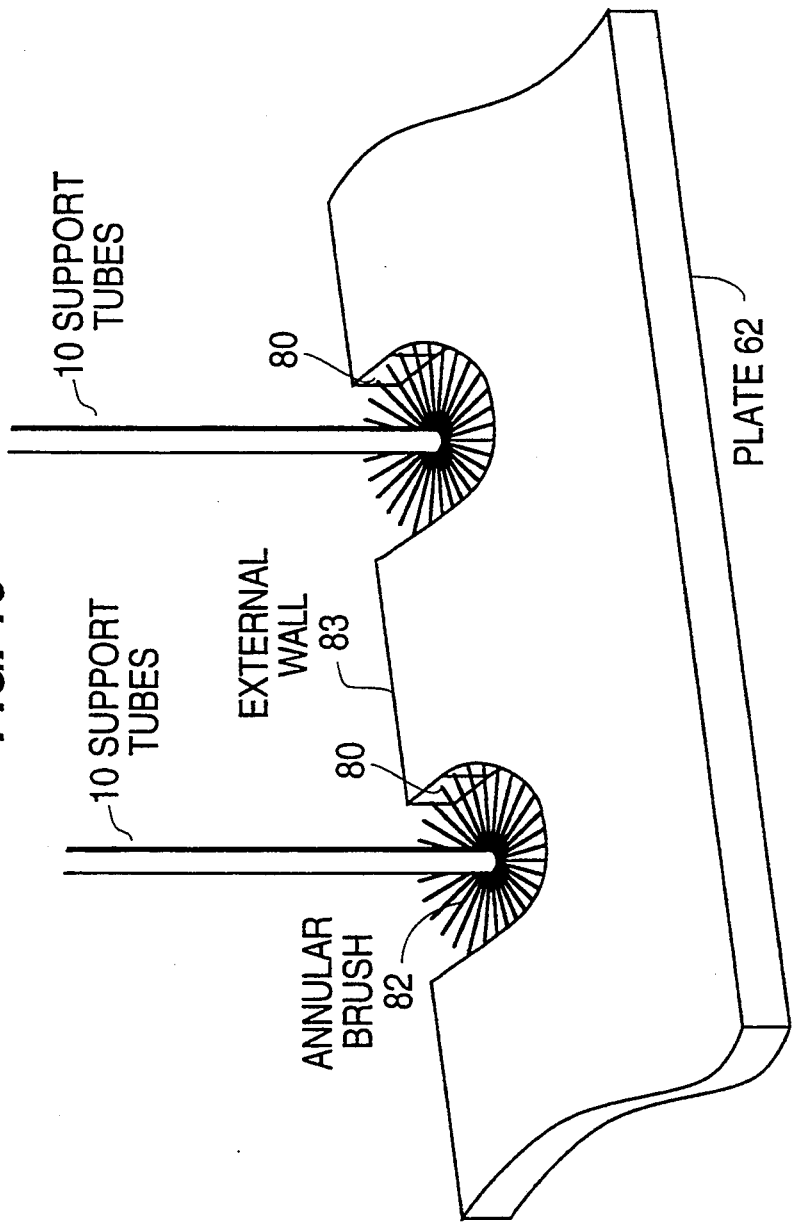
FIG. 10 is fragmentary perspective view of a cleaning plate having arcuate portions for supporting brushes for cleaning exterior walls of the support tubes of FIG. 1 and providing known calibration conditions for calibrating the sensors.

FIG. 6 illustrates a representative sample of a conduit, in the form of a duct 50, in which a plurality of sensors, in the form of sensor tubes of the type shown in FIG. 1 are mounted. As representatively shown, and as depicted in FIG. 10, five such sensor tubes 10 are shown traversing the width of the duct 50. Each sensor tube has five thermal sensors in the form of a thin foil resistor configured as shown in FIG. 5. Thus, each tube has five leads extending therefrom, each lead having four conductors. As shown, the gaseous flow through the duct 50 is orthogonal to the page of FIG. 6, and in the direction of the flow arrow 52, also in FIG. 7. The duct 50 is constructed with an upper member 53 connected to spaced, opposing side members 54, and 55 terminating in a lower member 56 connected to an optional cleaning mechanism 60, as will be described in connection with FIG. 11. The side wall 54 is located adjacent a thermal isolation cavity 58. An enclosed connection box 59 is provided for all wiring connections between the duct area and the remote analyzer 40 of FIG. 11.

The cleaning mechanism 60 includes a vertically transferable cleaner plate 62 driven by a pair of cleaner jack screws 63 and 64 shown in dotted line form in FIG. 6 to drive the cleaner plate between the lower member 56 and the upper member 53.

Figure 8:
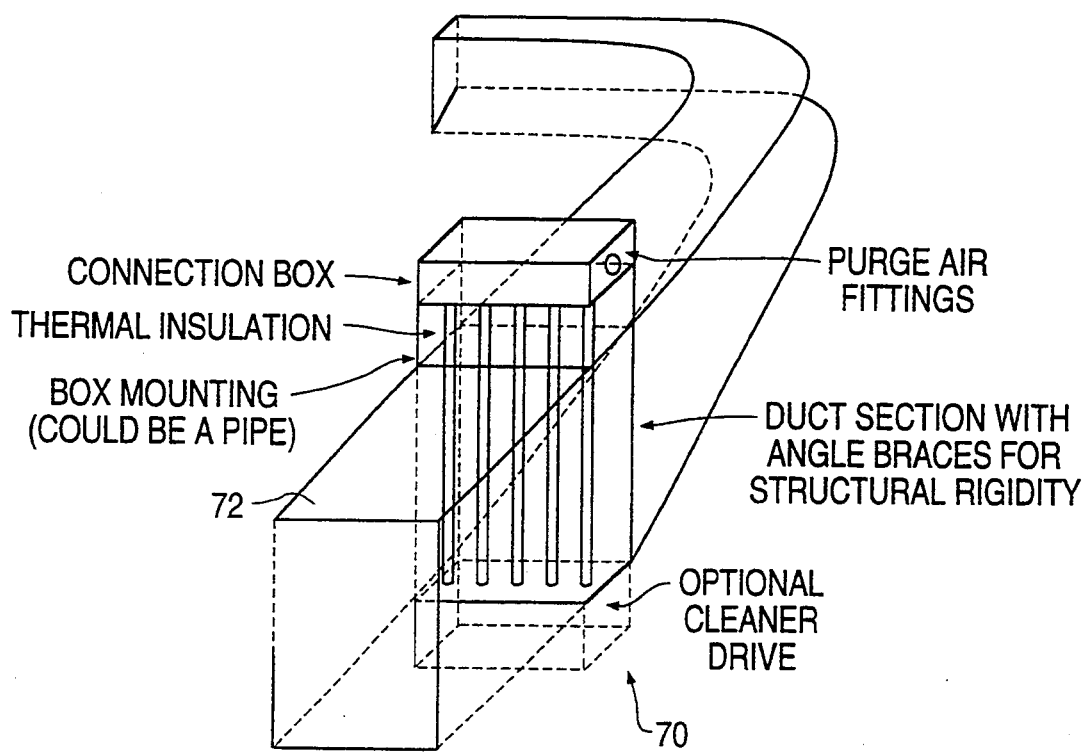
FIG. 8 is a representative perspective view of the duct section shown in FIG. 6 with an optional cleaner drive section.

As shown in FIG. 8, the invention may be provided as a unit 70 for insertion in a duct 72 in the field. The unit 70 includes a plurality of angle braces for structural rigidity. In practice, a section of an existing duct is removed and the unit 70 located in the removed section so that gaseous flow past the sensors 10 is established.

Figure 9:
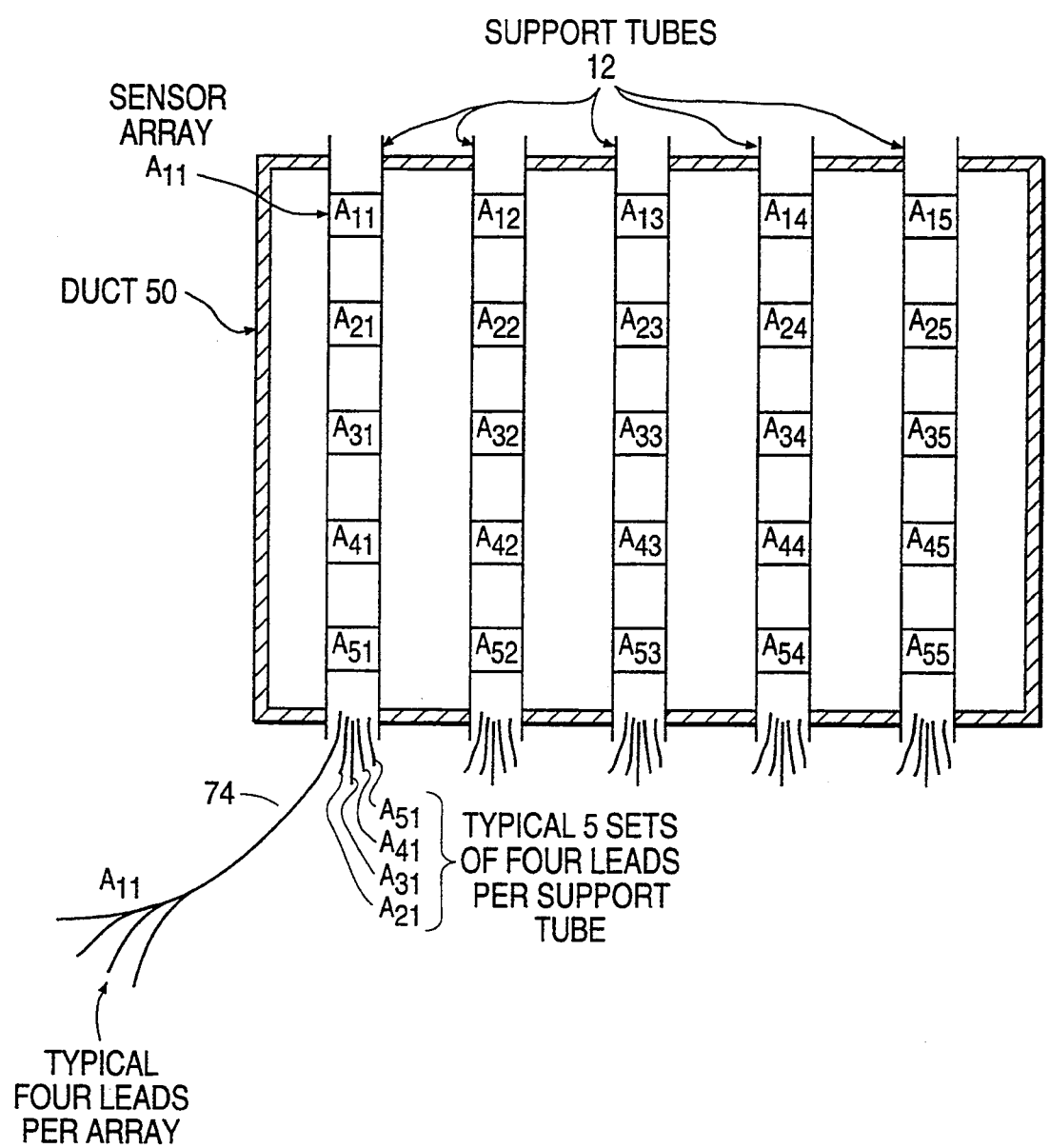
FIG. 9 is a schematic front elevation view of a 5×5 array of sensors located in the cross section of the duct.

FIG. 9 depicts schematically the flow sensor array described with FIG. 6. The organization of row and column designation reflects the organization of data and calculation results associated with each individual flow sensor. The wires 74 portray the typical bundle emanating from each support tube 12.

In a hostile dirty gaseous environment as best seen from FIG. 6, the exterior wall 13 of the support tubes 10 become coated thus adversely affecting the calibration of the sensor circuit mounted within the tube. The invention thus includes a cleaning mechanism 60 for periodically cleaning the exterior surface of the tubes 10. The mechanism 60 includes a cleaning plate 62 shown in greater detail in FIG. 10 as comprising a plurality of arcuate cutouts 80 equal in number to the support tubes 10. The plate 62 is arranged so that the arcuate cutouts effectively surround the exterior surface 13 of the support tubes 10. An annular brushing member 82 is secured on an external wall 83 of the cutout 80 and positioned so that its central opening surrounds the exterior wall of a support tube 10. The ends of the annular brushing member 82 are in contact with the external surface of the support tube 10 so that when the plate 62 is driven by the jackscrews 63 and 64, the brushes traverse the length of the support tube 12, thus brushing and cleaning the exterior surface 13 of the support tube 12. Preferably, the brushing member is made from stainless steel to withstand the environment, but other brushing materials could also be used. Moreover, while a jackscrew is shown for driving the plate 62 to perform the described cleaning action, other mechanisms could also be used to effect the lateral transfer of the cleaning plate. When so brushed, the sensor circuit within the support tube 10 will respond with a predictable signal which is compared by the analyzer 42 of FIG. 11 with a predetermined reference response. Such comparison yields a periodic check of the calibration determining the usability of the signal from each of the sensors located within each support tube 10. Out-of-calibration conditions are reported to the exterior displays.

Figure 11:
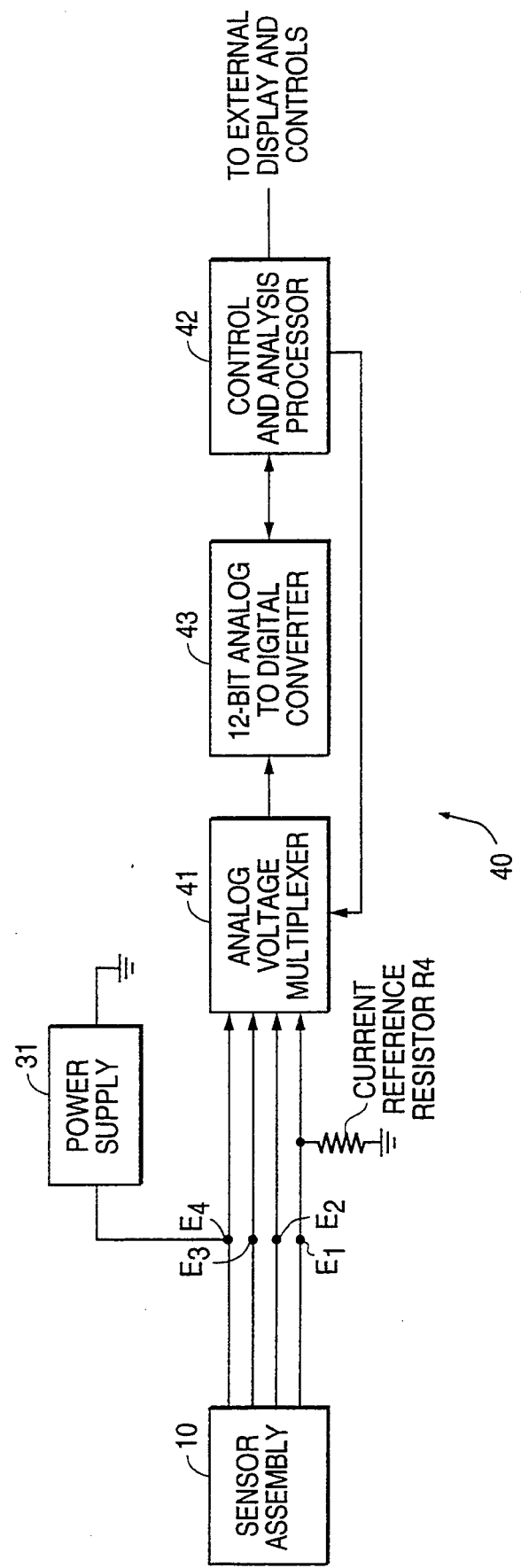
FIG. 11 is a block diagram of a circuit analyzer connected to the sensor array analyzing the output of the sensor array and providing an output signal and display representative thereof.

FIG. 11 shows a block diagram of a circuit analyzer in circuit with a sensor assembly 10, as shown generally by the reference numeral 40. Each sensor assembly 10 has four output leads E0 to E3 as described in connection with FIG. 4. Those output leads are connected to an analog voltage multiplexer 41 which under control from a control and analysis processor 42 selects the voltage to be measured by a 12-bit analog-to-digital converter 43. The circuit analyzer 40 is connected to the power supply 31 and the current reference resistor R4 as shown, and as previously described in connection with FIG. 4. The analysis processor 42 solves the equations needed to provide the usable output data from the circuit of FIG. 4, and then calculates the average flow velocity of the mass rate of flow of the fluid in a conduit, as will be described in connection with FIGS. 12 and 13. The analysis processor 42 is connected to an external display and controls as required by the particular application.

Figures 1, 12:
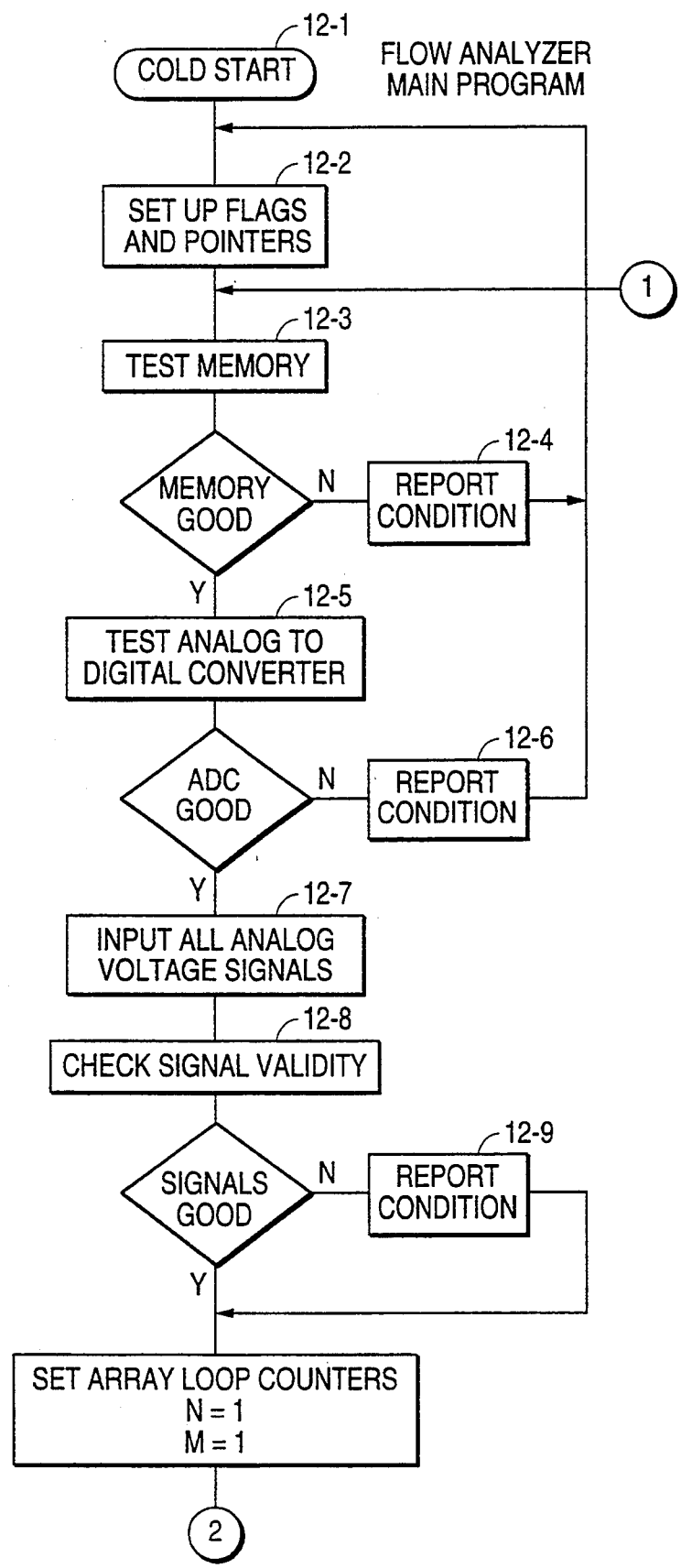
FIG. 12 (comprised of FIGS. 12-1 through 12-3) is a flow diagram describing a program used by the analyzer in FIG. 11, controlling the mechanism shown in FIGS. 1 to 11, measuring the analog voltages associated with the sensor configuration described in connection with FIG. 4, processing the voltages to provide output results, and analyzing and reporting results.
Figures 3, 12:
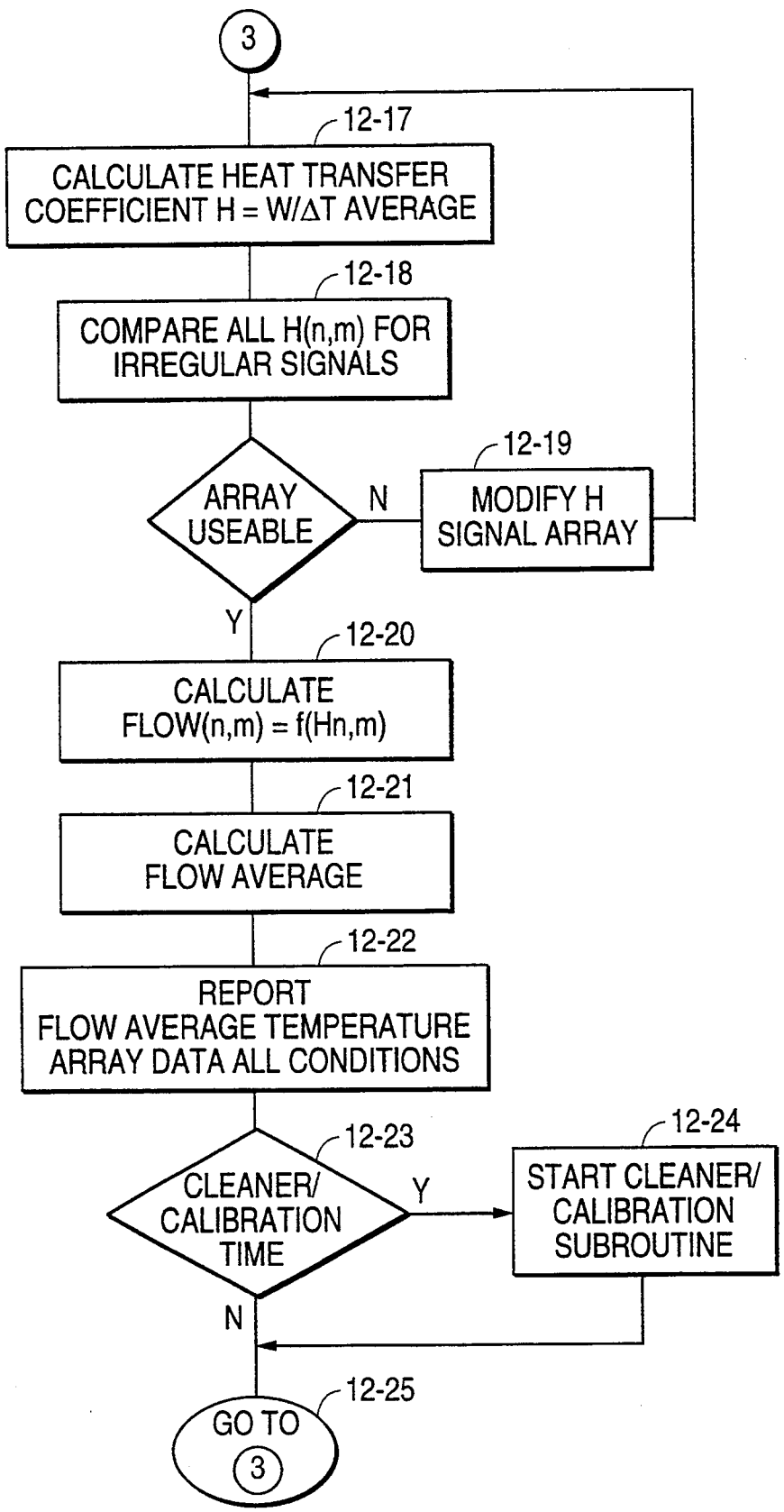
Figure 13:
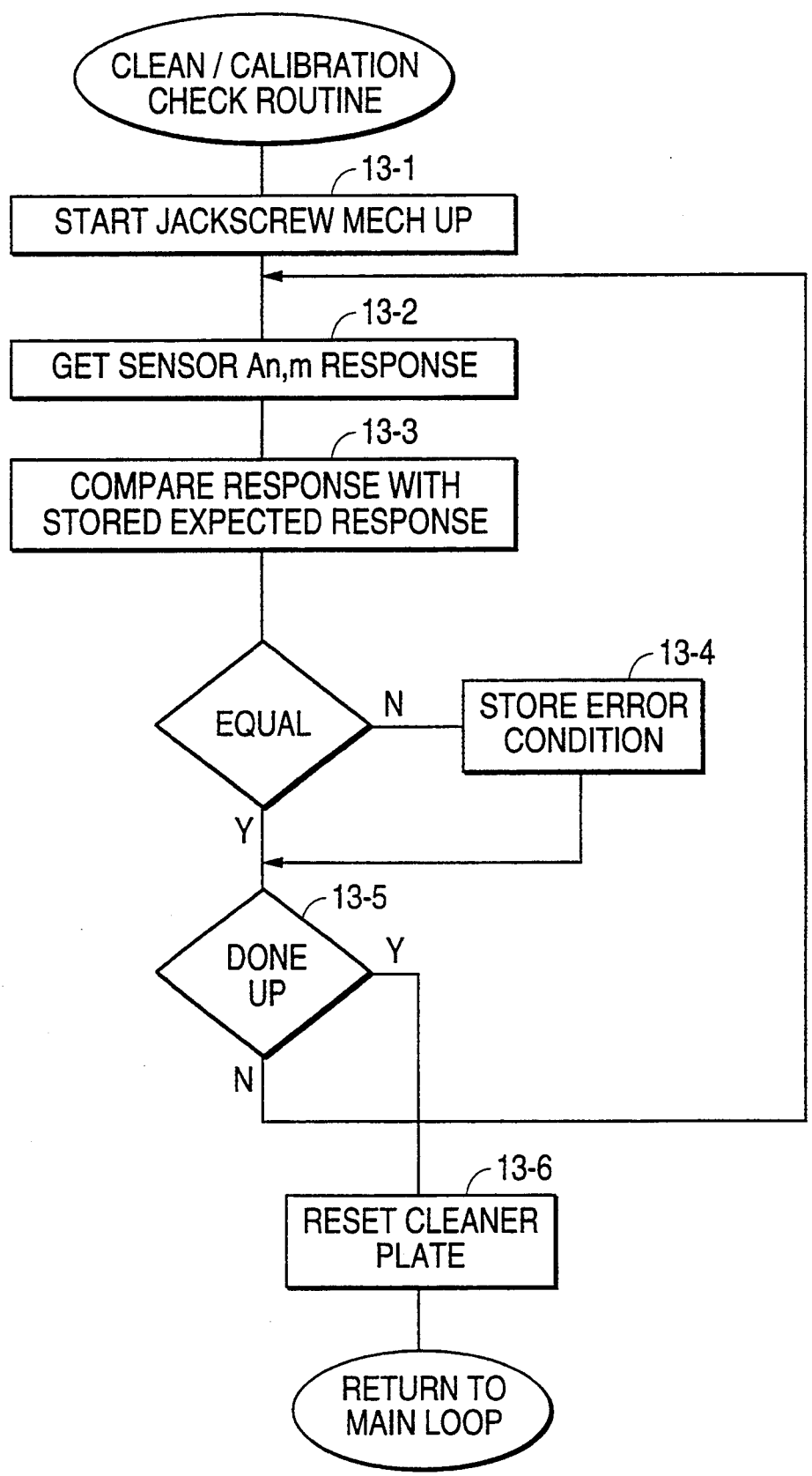
FIG. 13 is a flow diagram similar to FIG. 12, describing a program for cleaning the support tubes and calibrating the sensors during cleaning.

In a practical implementation, the processor 42 is preferably a microprocessor, programmed to calculate and command the display of the mass flow rate and associated temperatures, according to a program which is within the skill in the art based on the discussion of FIGS. 4, 12 and 13.

FIG. 12 shows a simplified routine illustrating the program implemented by the control and analysis processor 42 in FIG. 11. From a cold start 12-1, the routine sets up flags and pointers in a step 12-2 to enable correct references to memory addresses in the processor 42. For example, checks are made that all required constants are correct and usable. Following initialization, the memory is tested in a step 12-3. If the memory is not good, the condition is reported in a step 12-4 and the program returns to initialization step 12-2. After the memory checks satisfactorily, the analog-to digital (A/D) converter 43 is tested in a step 12-5. If the converter 43 is flawed, the condition is reported in a step 12-6 and the program returns to initialization step 12-2 as above.

Then, all of the analog voltage signals E0(n,m) to E3(n,m) for each of the sensors n,m as illustrated in FIG. 9, are sequentially input to the memory in the processor 42 in a step 12-7. Thereafter, the validity of those signals is checked in a step 12-8 according to their historical range. Signals outside of that range are reported in a step 12-9 and the program proceeds. If desired, signals significantly out of historical norm could prompt a reinitialization of the program, or a part thereof. If the checked analog signals are good, the program continues to a step 12-10 which sets loop counters for voltage array analysis.

The voltage array analysis begins with a step 12-11 which transfers signals E0(n,m) to E3(n,m) from the voltage array saved in memory in step 12-7. In step 12-12, reference resistors R2(n,m) and R4(n,m) are transferred from data stored in memory at calibration. The E and R values are thus transferred to local variables for processing in the subsequent steps collectively shown in the calculation step 12-13. In step 12-13, W1 signifies the wattage provided to the resistor R1, as found in FIG. 4 and the accompanying discussion. When each of the calculations shown in step 12-13 are completed, the calculations collectively noted in the step 12-14 are made. The reference characters T2 and T1 respectively represent the temperatures of the resistors R1 and R3; those temperatures are determined, for example, from an interpolation of values contained in a look-up table of temperatures for each corresponding resistance value for the resistors R1 and R3. Alternatively, those temperatures could be determined, as is known in the art, by evaluation of a polynomial equation having coefficients determined by a least squares curve fit for the resistance v. temperature data for resistors R1 and R3, available from the manufacturer.

The reference character H in the step 12-14 refers to the heat transfer coefficient for the particular sensor at its identified location in the array for the particular flow conditions in the duct at that location. In the step 12-15, the calculated values of H and T1 are transferred to appropriate n,m addresses in the memory associated with the sensor n,m. The memory thus contains, for the example shown in FIG. 9, twenty-five sets of H and T1 data which are continuously updated, as noted in the step 12-16 for all values of m, and in step 12-17 for all values of n, in an n,m array.

Now that the calculated values of H and T1 are stored in the memory, the average heat transfer coefficient of the total n,m array is calculated in a step 12-17. This average heat transfer coefficient is determined on a nonweighted basis using all of the available heat transfer coefficient data. In step 12-18, these data are evaluated for irregularities by comparing all heat transfer coefficients H(n,m) with the average calculated in the step 12-17. Data deemed unusable is modified or rejected and the routine returned to step 12-17 through the step 12-19. For example, data from an inoperative sensor are immediately recognizable as representing a maximum deviation from that calculated average from the step 12-17. Statistical bases or empirical experience may form the criterion for such exclusions. With questionable data thus excluded, the program is ready to calculate mass flow with a high degree of precision.

The routine thus continues to a step 12-20 which calculates mass flow of fluid in the duct for each sensor n,m that has not been excised from the data base in the steps 12-17 to 12-19, as described above. That flow may be calculated, for example, by using a spline fit program with constants for heat transfer v. flow determined empirically by factory calibration for each sensor array for each H(n,m), thus providing a number in units of mass flow rate per unit time. The procedures for spline fit processing of data is well known in the programming art as described in numerous texts for computer numeric processing. That flow can also be calculated using a polynomial curve evaluation for the same empirically derived calibration curves of heat transfer v. flow.

The flow average for the respective flows calculated in the step 12-20 is calculated in the step 12-21. The calculated flow average is reported in a step 12-22, as are temperature array data, and all conditions such as which sensors if any were discarded from the calculations, which conditions might require intervention, routine maintenance, and the like.

In the step 12-23, a local clock controls initiation of a cleaning cycle on a periodic basis, such as daily. When timely, the processor initiates such a cleaning and calibration cycle as is shown in the step 12-24, described in greater detail in connection with FIG. 13. When the loop is completed, as in the step 12-25. the routine returns to the step 12-3, representing a start for the process for other than cold start conditions.

A simplified cleaner/calibration routine is shown in FIG. 13. When a clean/calibration check routine is initiated at step 12-23 such as daily by an automatic timer in the step 12-23, or more frequently depending on the environment, a command is given at step 13-1 to start the jackscrew mechanism 63. As the jackscrew mechanism 63 drives the cleaning plate 62, the response of sensor An,m of FIG. 9 is obtained in step 13-2 by measuring the response of the sensor to a known heat sink condition caused by the brushes' contact with the surface of the exterior wall of the tube 10. That sink level is significantly greater than that of the gaseous flow so that the current gas flow condition has a negligible effect on the transient heat sink condition.

That transient heat sink condition caused by the brushes contacting the exterior surface of the tube at the location of the sensor An,m is compared in a step 13-3 with a stored expected response, determined empirically at factory calibration. If not equal, then the error condition is stored at a step 13-4 for later analysis. The routine then proceeds to interrogate each sensor in a support tube 10 until the upward cleaning sweep is completed, as noted by a step 13-5. It should be noted that the timing of the interrogations are coordinated with their locations within the array to determine whether any difficulty exists with the jackscrews and to minimize interference with ongoing measurements of gas flow within the duct. After the step 13-5, the cleaner plate is reset in a step 13-6 and the routine returns to the main loop at step 12-3 as described in connection with FIG. 12.

If desired, a repeat calibration test could be made as the cleaner plate is returned to the rest position.

The foregoing has described an apparatus and a method for determining a number of characteristics relating to the flow of a fluid through a large conduit, including the mass flow rate of such fluid through the conduit. Since changes may be made to the apparatus and to the method of using the apparatus without departing from the scope of the invention disclosed, it is intended that all matter contained in the written description of the invention or shown in the accompanying drawings shall be interpreted as illustrative and limited only by a reasonable interpretation of the appended claims.

What is claimed is:

1. A resistive network, comprising;
a first resistor;
a second resistor connected in series with a third resistor, said second resistor and said third resistor together being arranged in parallel with said first resistor at a first junction and a second junction;
a first lead having one end connected to said first junction and another end connected to a first terminal;
a second lead having one end connected to said second junction and another end connected to a second terminal;
a third lead having one end connected to said second junction and another end connected to a third terminal;
a fourth lead having one end connected to a point between said second resistor and said third resistor and another end connected to a fourth terminal;
a fourth resistor directly connected between a common reference voltage and said second terminal, whereby said fourth resistor is coupled in series with the combined arrangement of said first resistor, said second resistor and said third resistor; and
a source of power connected to said common reference voltage and to said first terminal, said source of power supplying a sufficient current through said first resistor to cause self-heating thereof, whereby power is dissipated from said first resistor; wherein said first resistor and said third resistor have values which vary with temperature in a known manner, and said second resistor and said fourth resistor have known, relatively constant values, whereby the respective temperatures of said first and third resistors can be determined based on the respective voltages at said first through fourth terminals and the known values of said second and fourth resistors.

2. The resistor network as set forth in claim 26 wherein the resistance values of the first and third resistors are calculated by calculating means connected respectively to said first through fourth terminals.

3. The resistor network as set forth in claim 2 wherein said first and said third resistors have a relatively precise high temperature coefficient of resistance while said second and fourth resistors have a relatively low temperature coefficient.

4. The resistor network as set forth in claim 3 wherein said first and said third resistors are foil resistors.

5. The resistor network as set forth in claim 4 wherein at least said foil resistors are mounted on support tubes for positioning in a duct.

6. The resistor network as set forth in claim 2 wherein a plurality of such resistor networks are respectively secured at spaces on an interior wall of a support tube, whereby said calculating means determines the power dissipated into the area proximate said interior wall, said power dissipation indicating mass flow therethrough such that the plurality of resistor networks define a flow meter element array.

7. The resistor network as set forth in claim 6 wherein a plurality of flow meter element arrays are located in a duct to define a grid of spaced resistor networks, whereby the mass flow through said duct is determined.

8. The resistor network as set forth in claim 7 further including means for calculating power delivered to said first resistor.

9. The resistor network as set forth in claim 8 wherein said first and third resistors are remotely positioned in a conduit and said calculating means further includes means for calculating mass flow through said conduit based on the calculated temperature of said first and second elements and the power delivered to said first resistor.

10. The resistor network as set forth in claim 9 wherein said calculating means includes means for determining the temperatures of said first and said third resistors.

11. The resistor network as set forth in claim 10 wherein said temperatures determining means includes a look up table of temperatures for each corresponding resistance value for the first and third resistors.

12. The resistor network as set forth in claim 10 wherein said temperatures determining means includes means for evaluating a polynomial equation having coefficients fitting resistance versus temperature data for said first and third resistors.

13. The resistor network as set forth in claim 10, wherein a plurality of such resistor networks are respectively positioned in said conduit to sense the mass flow therethrough at a corresponding number of positions therein, each such resistor network being operatively coupled to memory means for continuously storing the values detected from each resistor network.

14. The resistor network as set forth in claim 13 further including means for calculating the average heat transfer coefficient for each resistor network.

15. The resistor network as set forth in claims 14 further including means for calibrating said resistor networks.

16. The resistor network as set forth in claim 15 wherein said calibrating means includes a means for cleaning an exterior of a support tube for each of said plurality of resistor networks.

17. The resistor network as set forth in claim 1 wherein said first, said second, and said third resistors are secured to a wall of a support tube, whereby the power dissipation into the area proximate said wall can be determined.

18. The resistor network as set forth in claim 1 wherein said first resistor corresponds to the resistance of a heater/thermometer, said second resistor is a reference resistor, said third resistor corresponds to the resistance of a thermometer, and said fourth resistor is a current reference resistor by which the current through said second junction is determined.

19. A resistive network, comprising;
a first element having a variable resistance;
a second element having a known resistance connected in series with a third element having a variable resistance, said second element and said third element together being arranged in parallel with said first element at a first junction and a second junction;

a first lead having one end connected to said first junction and another end connected to a first terminal;

a second lead having one end connected to said second junction and another end connected to a second terminal;

a third lead having one end connected to said second junction and another end connected to a third terminal;

a fourth lead having one end connected to a point between said second element and said third element and another end connected to a fourth terminal;

a fourth element having a known resistance directly connected between a common reference voltage and said second terminal, whereby said fourth element is coupled in series with the combined arrangement of said first element, said second element and said third element;

a source of power coupled to said common reference voltage and to said first terminal, said source of power supplying a sufficient current through said first element to cause self-heating thereof, whereby power is dissipated through said first element; and means coupled to said first through fourth terminals for calculating the respective resistances of said first element and said third element based on the respective voltages at said first through fourth terminals and the known resistances of said second element and said fourth element.

20. The resistive network of claim 19 wherein each said first through fourth leads having internal resistances which are known or are substantially equal.

21. The resistive network of claim 19 wherein said first and said third elements are foil resistors having a relatively high temperature coefficient of resistance while said second and said fourth elements are foil resistors having a relatively low temperature coefficient, whereby over a given range of temperatures the respective resistances of said first and said third elements are substantially constant relative to the respective resistances of said second and fourth resistances.

22. The resistor network as set forth in claim 21 wherein said foil resistors are thin foil resistors made of nickel, platinum or Evanohm ® brand alloy.

23. The resistor network as set forth in claim 22 wherein at least said first and said third elements are mounted on support tubes positioned in a conduit.

24. The resistor network as set forth in claim 23 wherein said calculating means calculates the temperature of said first and third elements and the power dissipated by said first element, and determines the mass flow through said conduit based thereon.

25. The resistor network as set forth in claim 24 wherein the resistor network is one of a plurality of identical networks placed within a conduit to form an array of mass flow sensors from which an average mass flow can be detected.

* * * * *